UNITED STATES PATENT OFFICE.

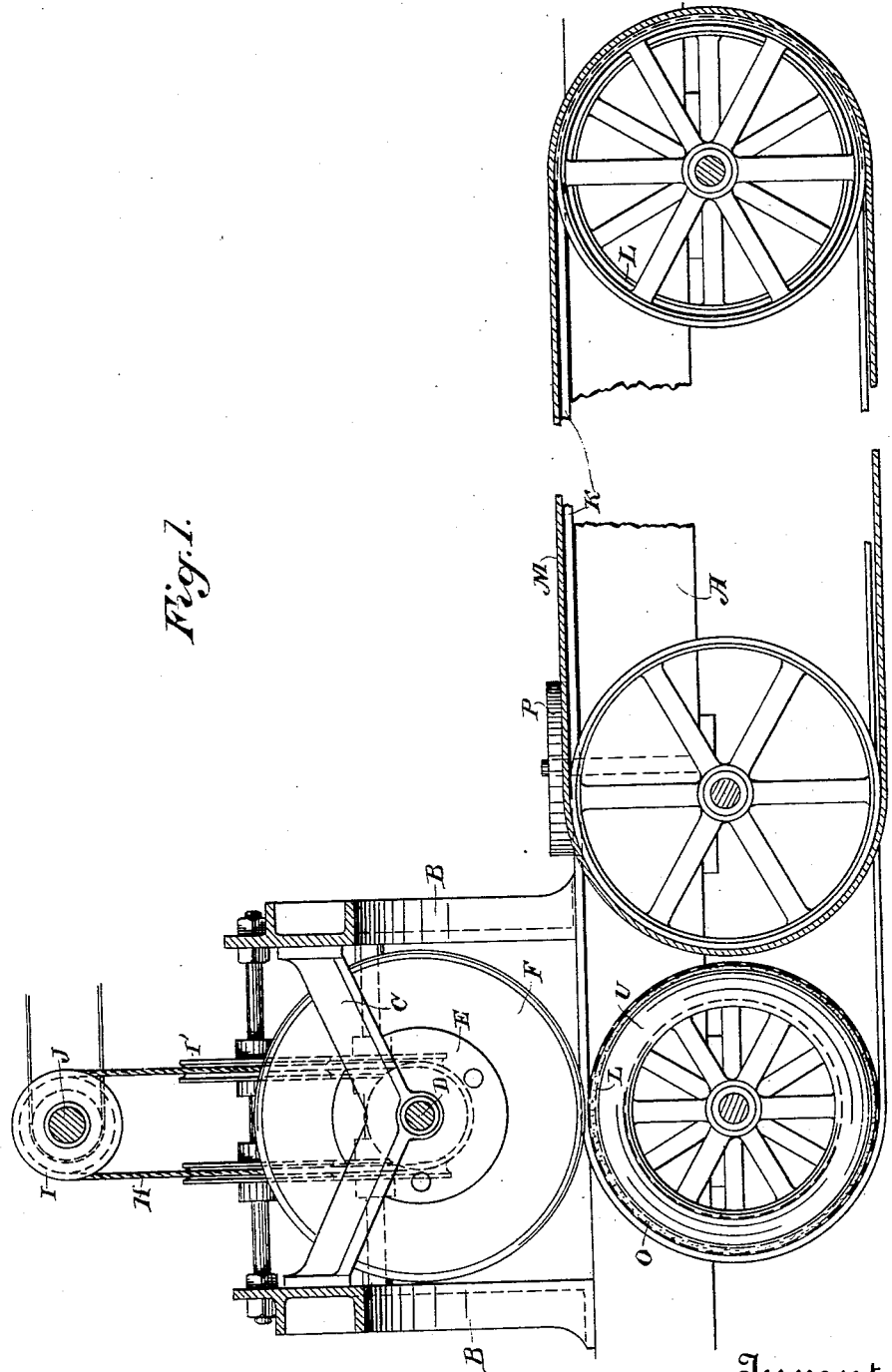

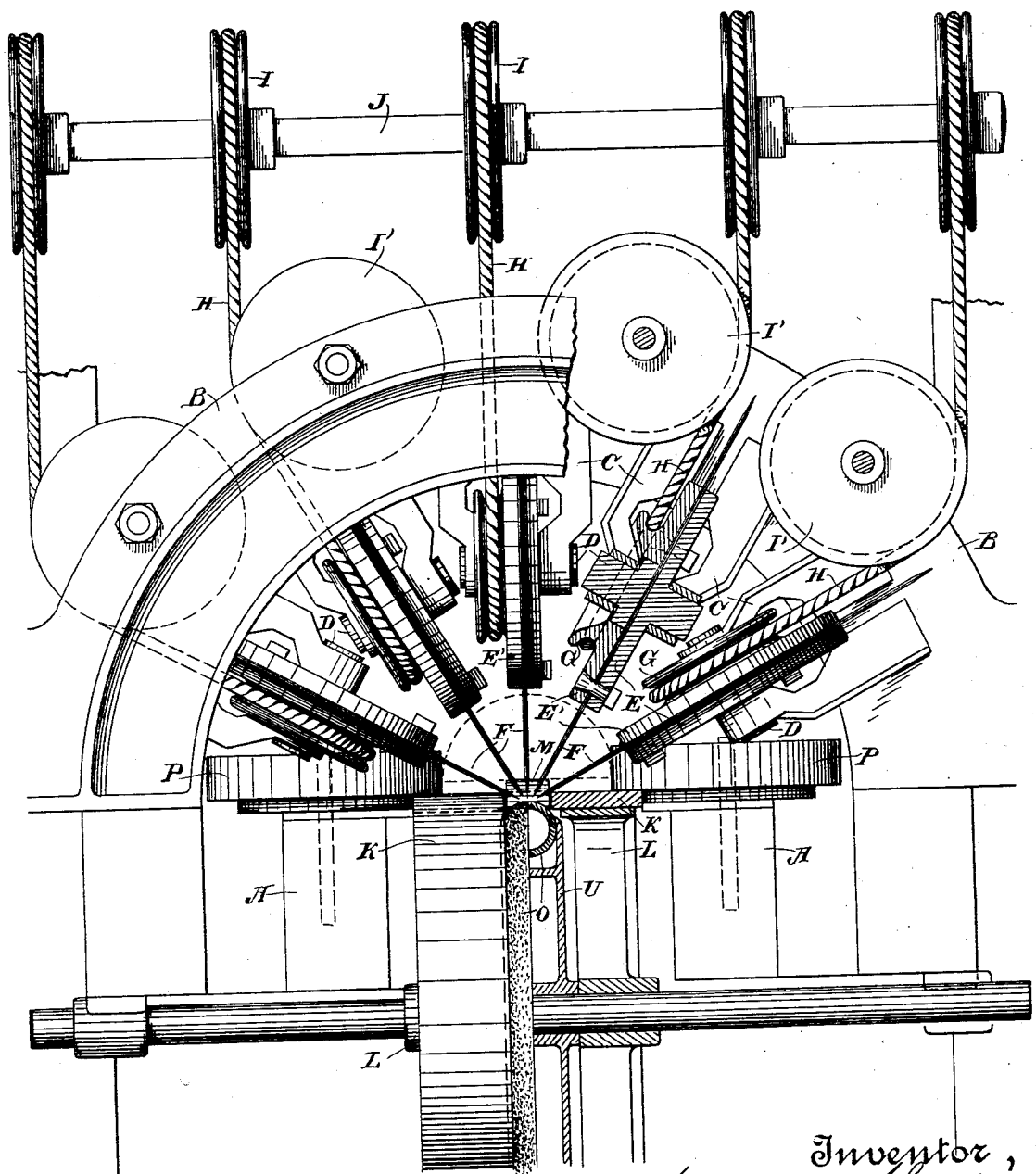

SIVERT H. SHELLEY, OF BERRYESSA, CALIFORNIA.

FRUIT-SLICING MACHINE.

SPECIFICATION forming part of Letters Patent No. 580,229, dated April 6, 1897.

Application filed December 8, 1896. Serial No. 614,929. (No model.)

*To all whom it may concern:*

Be it known that I, SIVERT H. SHELLEY, a citizen of the United States, residing at Berryessa, county of Santa Clara, State of California, have invented an Improvement in Fruit-Slicing Machines; and I hereby declare the following to be a full, clear, and exact description of the same.

My invention relates to a machine which is especially designed to slice fruit preparatory to its being canned, dried, or preserved, or put up in other ways.

It consists of the parts and the constructions and combinations of parts hereinafter described and claimed.

Figure 1 is a longitudinal section of the machine. Fig. 2 is a front view showing the relative position of the cutters with a section of one of them.

The apparatus may be supported upon any suitable base or table A. Upon this table are fixed standards B in the form of arcs or segments of a circle. Extending between these arcs or segments are yokes C, so disposed that their central portions furnish journal-boxes for the shafts D, upon which the cutters are mounted. The cutters may be mounted in any suitable or desirable way upon these shafts. In the present case I have shown disks E fixed to the shafts, and the circular cutting-blades F are secured to these disks by means of bolts or pins passing through holes at proper intervals. Upon the opposite side of the cutters are the disks E', which are secured through the cutter-blades by means of the pins or bolts which pass through the blades and the clamping-disks E and E'. The disk E' has formed with it a grooved channel G, which serves as a pulley for the driving-rope H, and this driving-rope leads from the pulley up to and around a guide-pulley I' to driving-pulleys I upon a suitably-disposed counter-shaft J.

It will be understood that in describing the pulleys and ropes for transmitting power to the cutters I also reserve the right to employ gearing or any other suitable well-known transmitting device.

The standards B being curved into segmental form, as shown, it will be seen that the supporting-yokes C will be arranged in such a manner that the circular cutters F will stand in radial lines, their edges converging toward a common center and standing as near together as may be desired, so that when the fruit is passed between these revolving cutters it will be sliced into wedge-shaped sections by the action of the cutters.

The fruit is brought to the cutters upon horizontal traveling belts or carriers K, passing around bearing and driving pulleys L, one of which is situated approximately beneath the cutters and the other at a sufficient distance therefrom to allow the attendants to place the fruit upon the belts. These belts are in practice about one inch and a half in width each and separated from each other about three-fourths of an inch. The cutting-blades converge so that their edges are a short distance below the level of the tops of the carrying-belts. These belts K are retained in place by guides which keep them steady in their travel.

Just above the space between the belts K is a third belt M, which extends to a point near to the cutters F when it passes through between the belts K and around its carrying-pulley at that end. The object of this third belt is to hold the fruit up and prevent its sagging between the other two belts until it reaches the point where it is to be cut. This belt is preferably made of a different color, which serves as a guide for the attendants in placing the fruit.

U is a wheel or pulley loosely journaled upon the shaft with the pulleys L, over which the belts K pass. This pulley has a soft yielding rim, which may be made of rubber, either solid or having a central opening through it, or it may be made so as to be inflated with air like a pneumatic tire and thus present a yielding surface. This rim O is carried by its pulley just beneath the surface of the belts K and also beneath the meeting or adjacent edges of the cutting-knives F, and as the fruit leaves the central belt M it immediately passes over this elastic-surfaced pulley and is held up, so that the revolving knives F will cut cleanly through the fruit, which is thence carried back to the point of discharge in rear of the knives. The object of this yielding-surfaced pulley is, in addition to its support for the fruit while being cut, to allow any pits or hard substances which may be brought in by the fruit to indent the soft rim and thus prevent damage to the cutting-knives.

The fruit is pitted by some previous machine and is then placed upon the carrying-belts K and M by the attendants, and these belts transmit it to and beneath the radially-disposed cutters. If any fruit should happen to have a broken portion of a pit which has not been removed still attached to it, it will be seen that the yielding surface of the pulley would allow the pit to be depressed into it, so that the knives would cut through the fruit without being damaged by the hard pit.

In order to insure the fruit being properly delivered to the cutters, I have shown rollers P journaled to turn horizontally with their peripheries resting upon the belts K, so that as the belts K travel they will impart motion to the rollers P, and these rollers, projecting slightly over the outer edges of the belts, will serve to move any fruit not centrally placed toward the central space between the belts, so that it is sure to pass beneath the cutting-knives in the proper manner.

Having thus described my invention, what I claim as new, and desire to secure by Letters Patent, is—

1. A machine for slicing fruit consisting of a series of rotary cutters, the blades of which stand in radial planes so that the edges of the cutters converge and stand closely together, a mechanism by which the cutters are rotated, a means for passing the fruit beneath and between the converging edges of the cutters, and a yielding surface beneath the cutters for receiving said fruit for holding the fruit up into contact with the cutters as it passes.

2. A machine for slicing fruit consisting of a series of circular radially disposed and journaled cutting-blades with mechanism by which they are rotated, the inner edges of said blades converging so as to turn in close proximity with each other, spaced carrying-belts traveling upon each side of and slightly above the adjacent edges of the cutters, and an intermediate yielding support for the fruit while passing beneath the cutters.

3. A machine for slicing fruit consisting of circular rotary cutting-blades journaled so as to diverge from a common center outwardly, and having a mechanism by which they are rotated, guided carriers traveling side by side with an intermediate space between which the edges of the cutters converge at a point below the surface of the belts, and an independently-rotating pulley journaled beneath the cutters having a yielding peripheral rim which supports the fruit as it passes beneath the cutters.

4. A machine for slicing fruit consisting of circular rotating cutting-blades journaled so as to diverge from a common center outwardly, carriers upon which the fruit is brought to the cutters, said carriers being separated so that the converging edges of the cutters are slightly beneath the level of the carriers, a yielding surface intermediate between the carriers and beneath the cutters whereby the fruit is held to place while the cutters are acting, and an intermediate carrier extending between the main carriers and slightly above the level thereof whereby the central portion of the fruit is prevented from sinking between the main carriers.

In witness whereof I have hereunto set my hand.

SIVERT H. SHELLEY.

Witnesses:
S. H. NOURSE,
GEO. H. STRONG.